US008359402B2

(12) United States Patent
Cross et al.

(10) Patent No.: US 8,359,402 B2
(45) Date of Patent: Jan. 22, 2013

(54) INTERCEPT DEVICE FOR PROVIDING CONTENT

(75) Inventors: Matthew E. Cross, Mason, NH (US); Bruce E. Mann, Mason, NH (US)

(73) Assignee: SeaChange International, Inc., Acton, MA (US)

( * ) Notice: Subject to any disclaimer, the term of this patent is extended or adjusted under 35 U.S.C. 154(b) by 198 days.

(21) Appl. No.: 12/621,995

(22) Filed: Nov. 19, 2009

(65) Prior Publication Data
US 2010/0268814 A1 Oct. 21, 2010

Related U.S. Application Data

(60) Provisional application No. 61/116,273, filed on Nov. 19, 2008.

(51) Int. Cl.
G06F 15/16 (2006.01)

(52) U.S. Cl. ........................................................ 709/233

(58) Field of Classification Search ................... 709/233
See application file for complete search history.

(56) References Cited

U.S. PATENT DOCUMENTS

| | | | |
|---|---|---|---|
| 6,108,703 A | 8/2000 | Leighton et al. | |
| 6,185,598 B1 | 2/2001 | Farber et al. | |
| 6,205,481 B1 * | 3/2001 | Heddaya et al. | 709/226 |
| 6,327,242 B1 | 12/2001 | Amicangioli et al. | |
| 6,366,947 B1 | 4/2002 | Kavner | |
| 6,535,509 B2 | 3/2003 | Amicangioli | |
| 6,553,376 B1 * | 4/2003 | Lewis et al. | 1/1 |
| 6,553,413 B1 | 4/2003 | Leighton et al. | |
| 6,622,157 B1 | 9/2003 | Heddaya et al. | |
| 6,829,654 B1 * | 12/2004 | Jungck | 709/246 |
| 7,003,555 B1 * | 2/2006 | Jungck | 709/219 |
| 7,032,031 B2 * | 4/2006 | Jungck et al. | 709/246 |
| 7,103,645 B2 * | 9/2006 | Leighton et al. | 709/219 |
| 7,313,614 B2 | 12/2007 | Considine et al. | |
| 7,437,482 B2 | 10/2008 | Jungck | |
| 7,472,201 B1 * | 12/2008 | Aitken | 709/245 |
| 7,584,294 B2 * | 9/2009 | Plamondon | 709/233 |
| 7,693,959 B2 | 4/2010 | Leighton et al. | |
| 2002/0035624 A1 * | 3/2002 | Kim | 709/222 |
| 2002/0120782 A1 * | 8/2002 | Dillon et al. | 709/246 |
| 2004/0100976 A1 * | 5/2004 | Chang et al. | 370/401 |
| 2006/0242313 A1 | 10/2006 | Le et al. | |
| 2007/0058621 A1 * | 3/2007 | Okmianski et al. | 370/389 |
| 2007/0248029 A1 | 10/2007 | Merkey et al. | |
| 2008/0228938 A1 * | 9/2008 | Plamondon | 709/233 |

OTHER PUBLICATIONS

Balakrishnan, H., "Lecture 2: The Internetworking Problem," Massachusetts Institute of Technology, Sep. 10, 2002, pp. 1-12.
Balakrishnan, H., "The Internet Domain Name System," MIT Course No. 6.829, Fall 2002, 36 pages.
Buzzi, M., et al., "Introducing Transparent Web Caching in a Local Area Network," 2000, 7 pages.

(Continued)

*Primary Examiner* — Firmin Backer
*Assistant Examiner* — Michael A Chambers
(74) *Attorney, Agent, or Firm* — Proskauer Rose LLP

(57) ABSTRACT

Described are computerized methods and apparatuses, including computer program products, for network virtualization. An intercept device receives a DNS response message from a DNS server. The DNS response includes a domain name, a network address associated with the domain name, and a destination address of a first network device. The intercept device determines whether the domain name satisfies a DNS intercept criterion. If the domain name satisfies the DNS intercept criterion, then a request intercept criterion is updated to include the network address associated with the domain name. The DNS response message is transmitted on to the first network device by the intercept server.

21 Claims, 17 Drawing Sheets

OTHER PUBLICATIONS

Danzig, P., "Transparent, Scalable, Fail-Safe Web Caching," Available: http://web.archive.org/web/20000610092406/www.netapp.com/tech_library/3033.html (accessed Nov. 25, 2008), pp. 1-9.

Feamster, N., "Security Problems with the Internet Architecture," Massachusetts Institute of Technology, Sep. 26, 2002, pp. 1-13.

Feamster, N., "Anonymity in the Internet," Massachusetts Institute of Technology, Nov. 22, 2002, pp. 1-4.

Joncheray, L., "Simple Active Attack Against TCP," Proceedings of the Fifth USENIX UNIX Security Sumposium, Jun. 1995, 14 pages.

Modiano, E., "Lectures 24 & 25, Higher Layer Protocols: TCP/IP and ATM," Massachusetts Institute of Technology, Fall 2002, 65 pages.

Schiller, I.J., Mobile Communications—Chapter 9: Mobile Transport Layer, University of Berlin, 2005, pp. 9.1-9.18.

Schiller, J.H., "Mobile Communications—Chapter 10: Mobile Transport Layer," University of Karlsruhe, Institute of Telematics, 1999, pp. 10.1-10.8.

"Transparent Web Caching with the NetEnforcer, Version 3.x," Allot Communications, Jan. 10, 2001, pp. 1-10.

\* cited by examiner

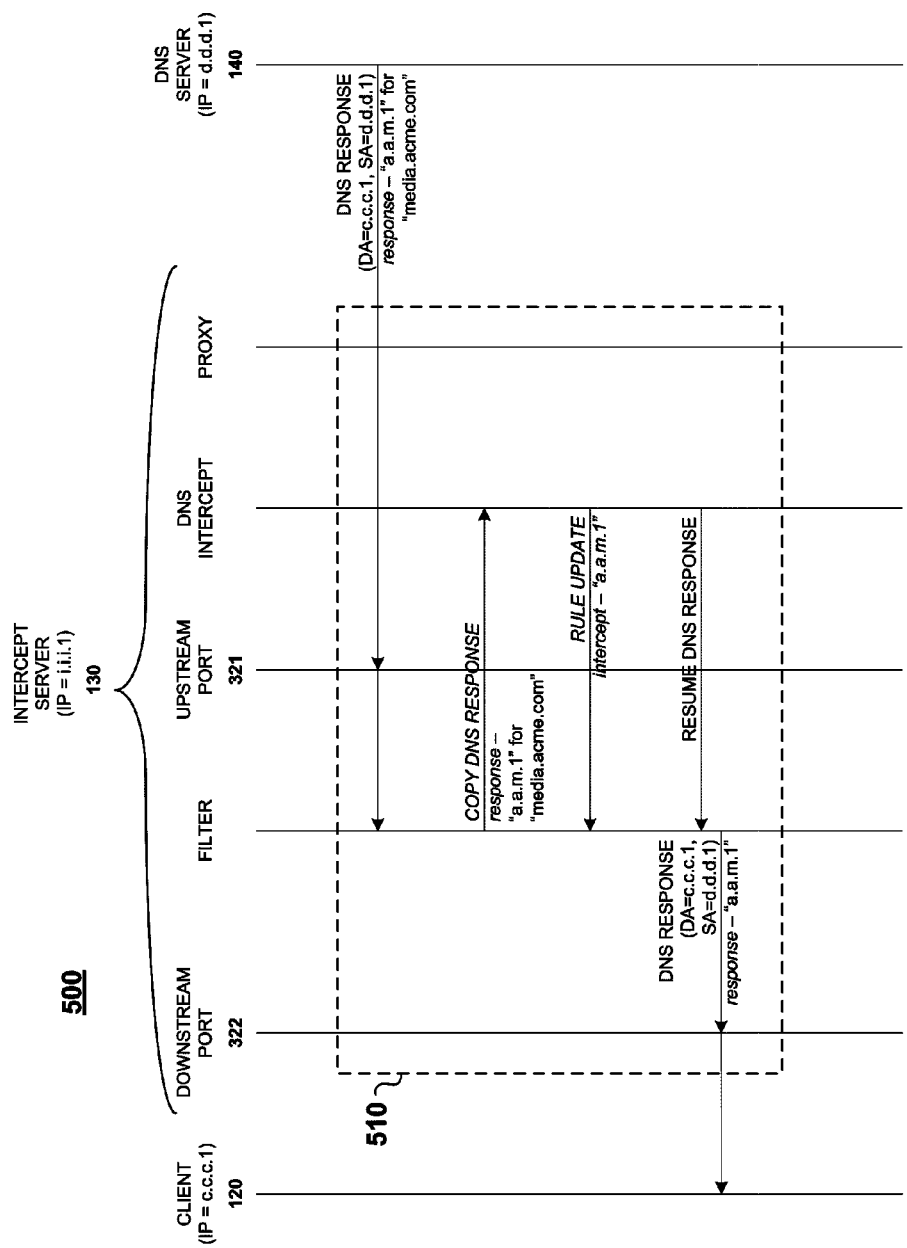
Fig. 5A – DNS SNOOPING

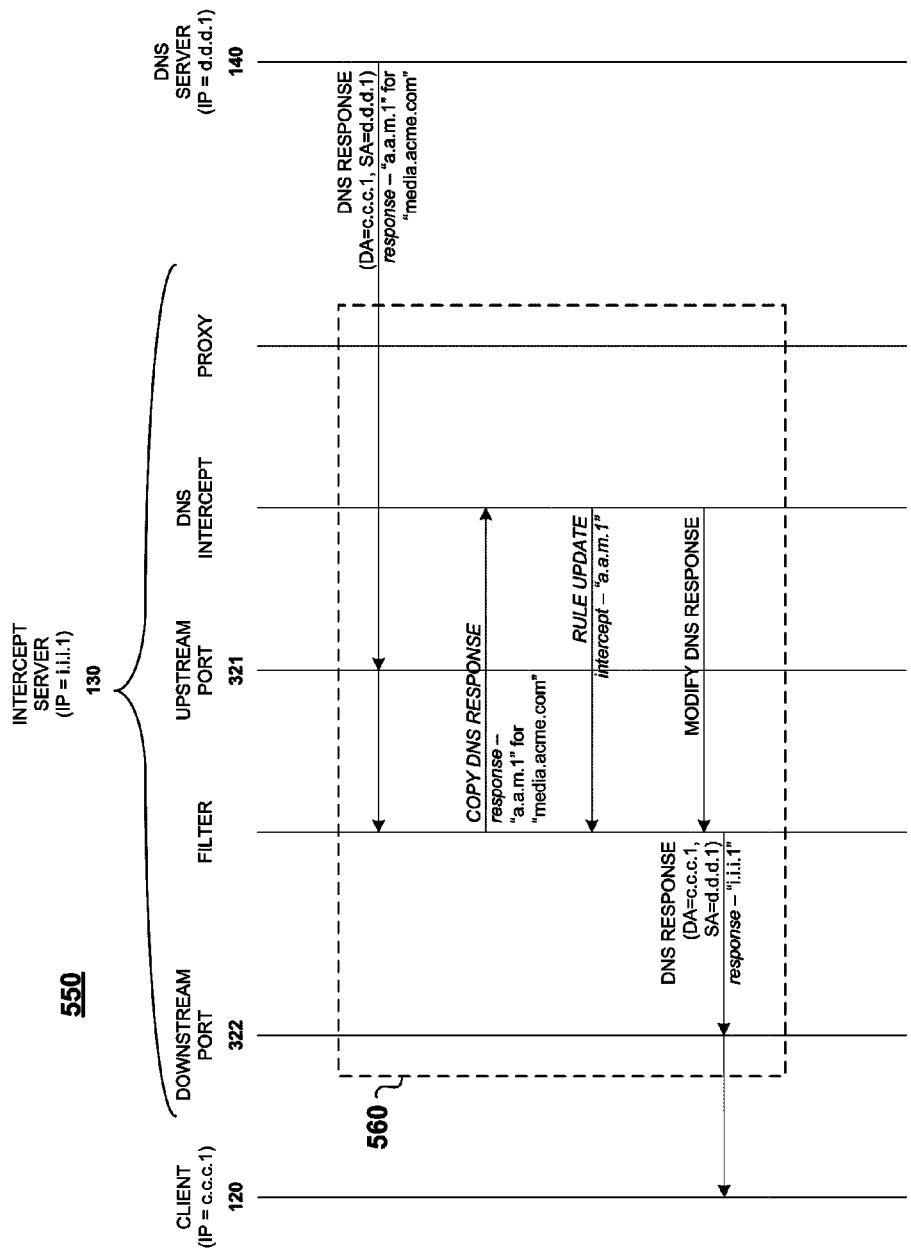
Fig. 5B – DNS SNOOPING

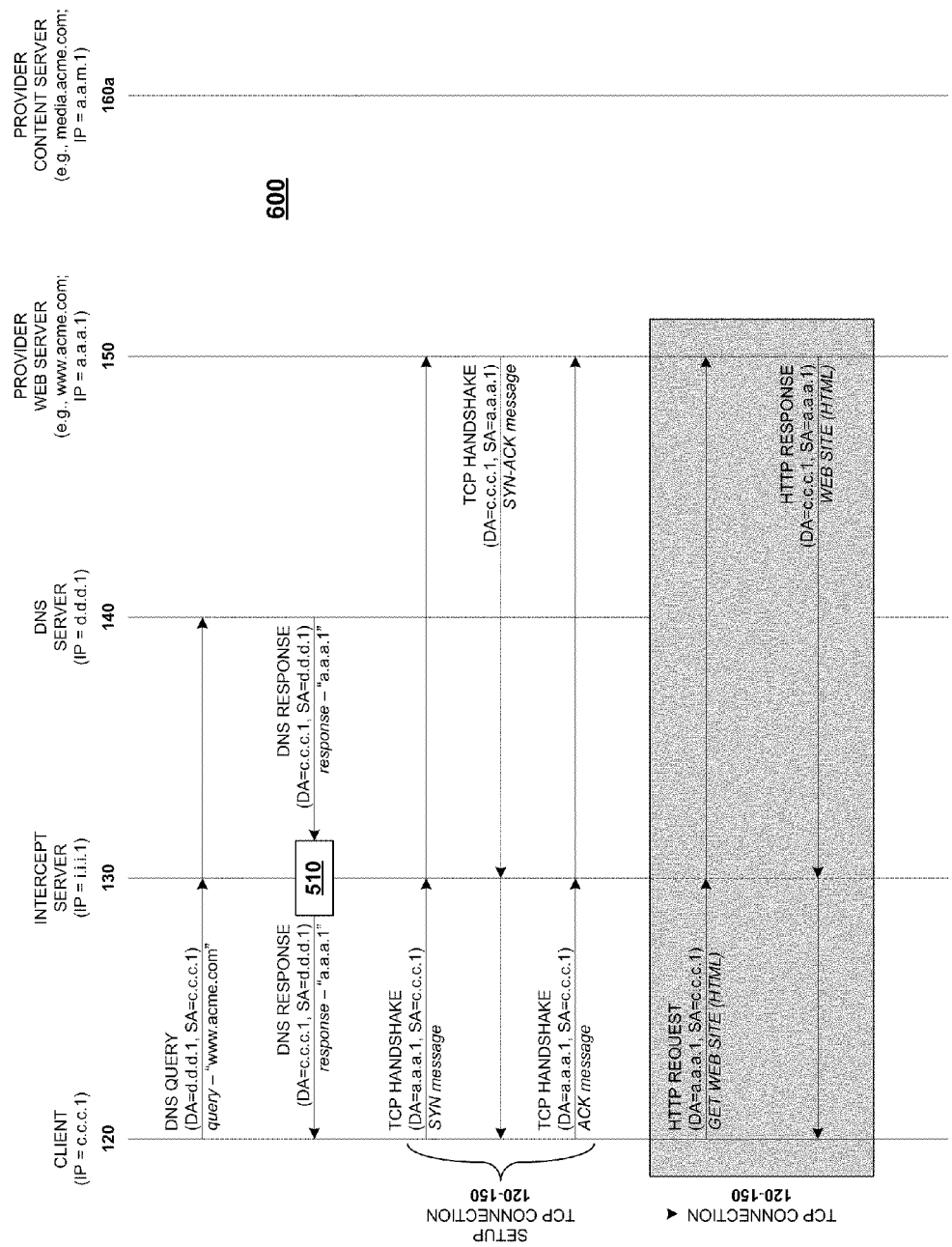
Fig. 6 – UNFILTERED HTML DELIVERY

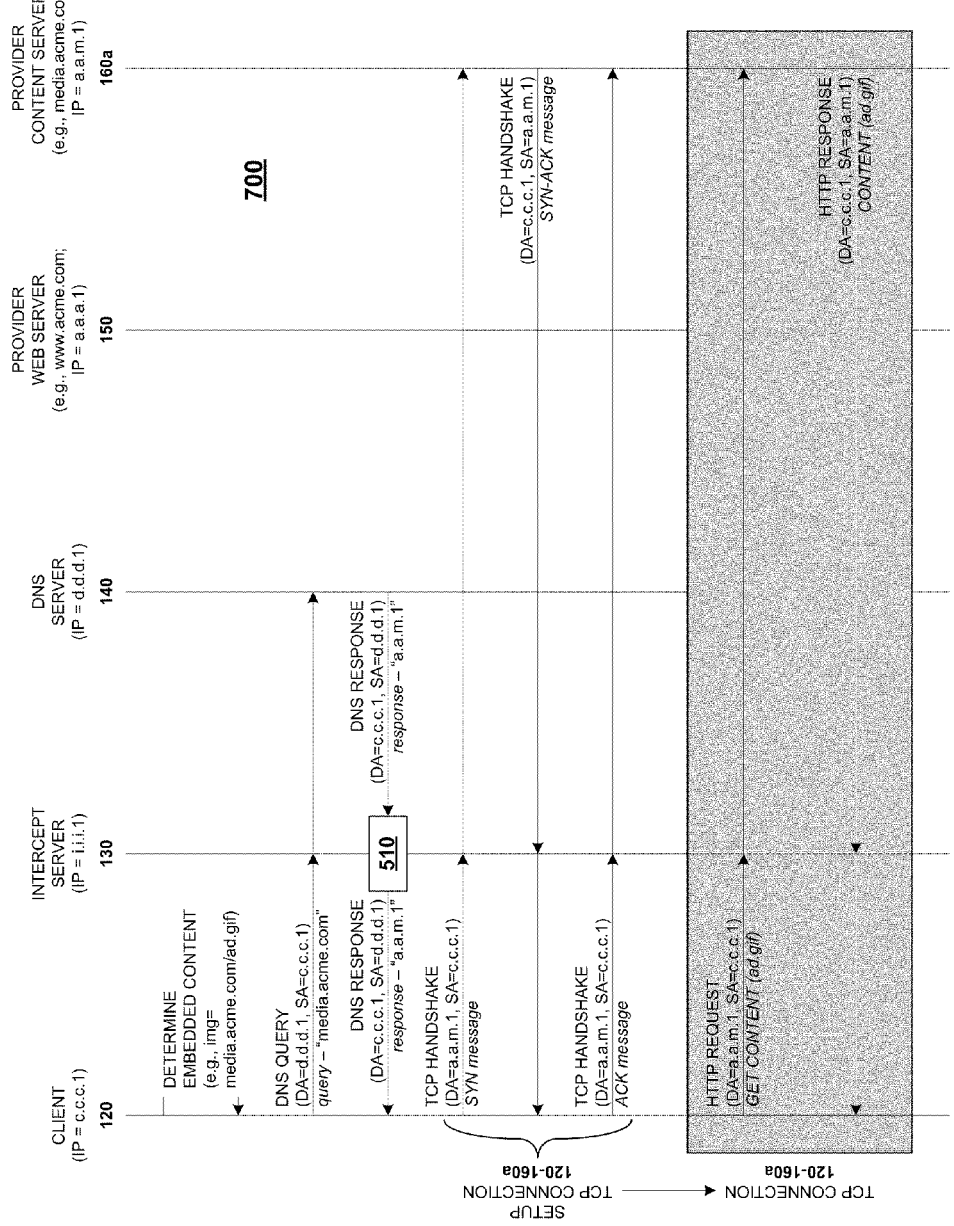
Fig. 7 – UNFILTERED CONTENT DELIVERY

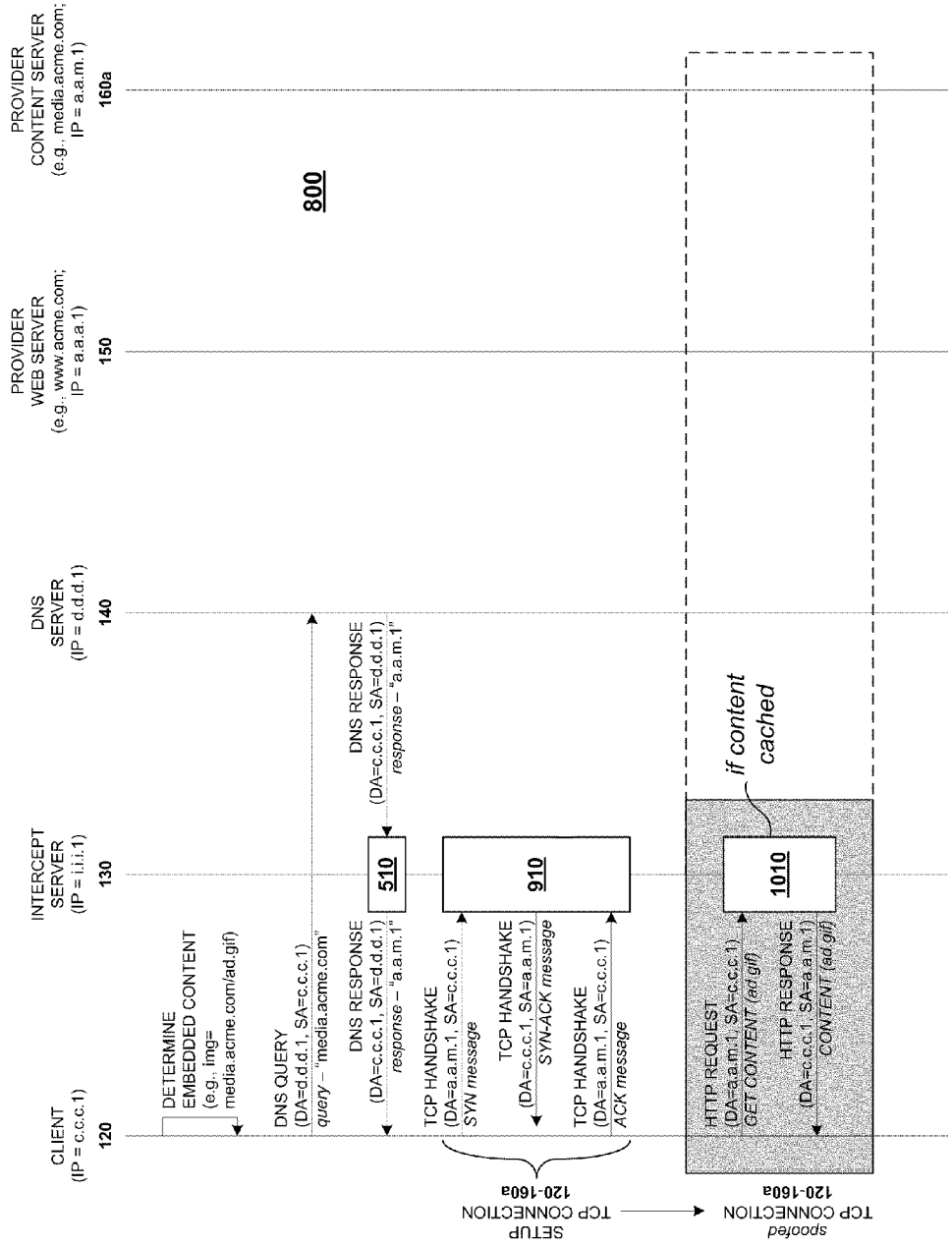
Fig. 8A – CONTENT DELIVERY

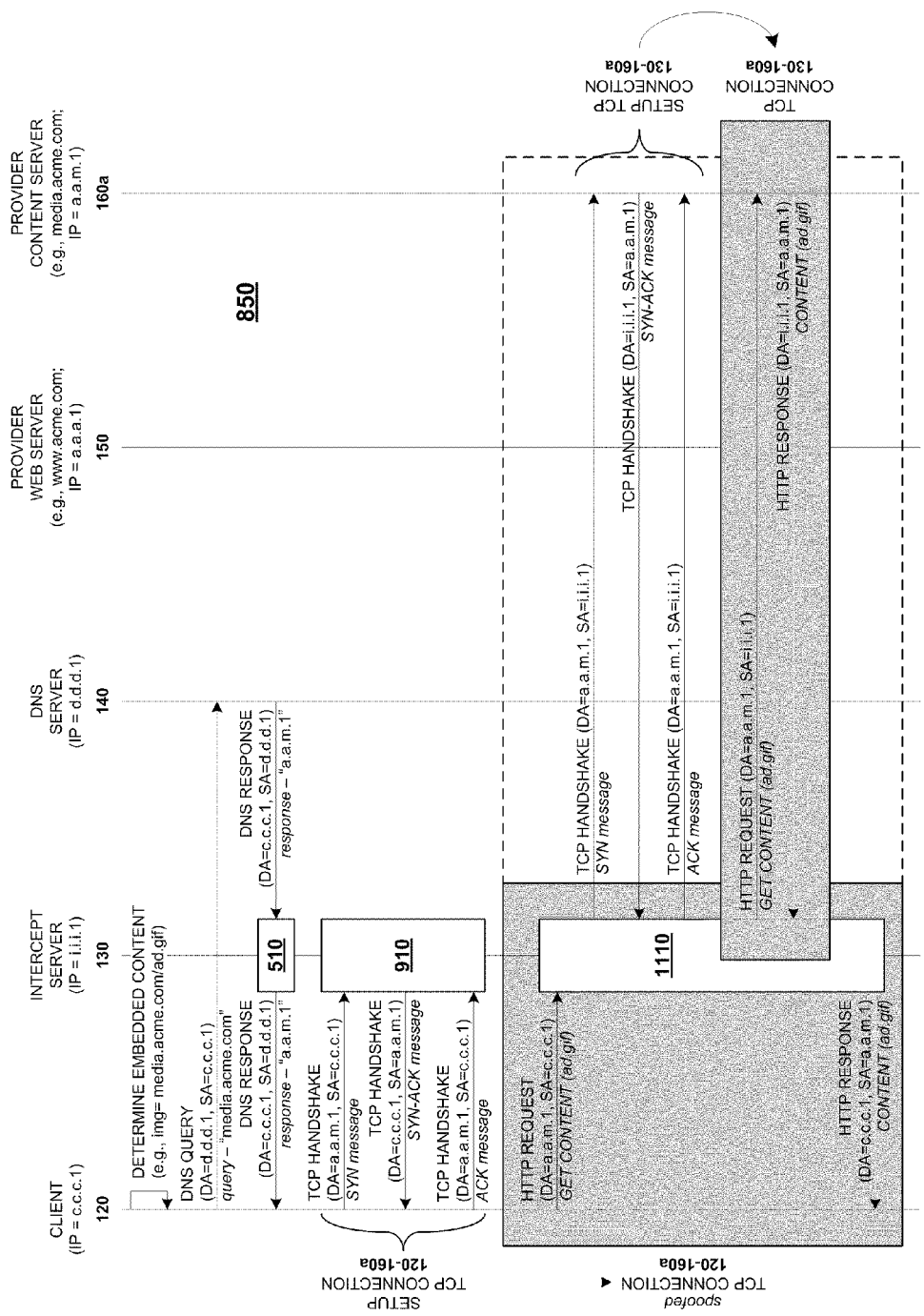
Fig. 8B – CONTENT DELIVERY

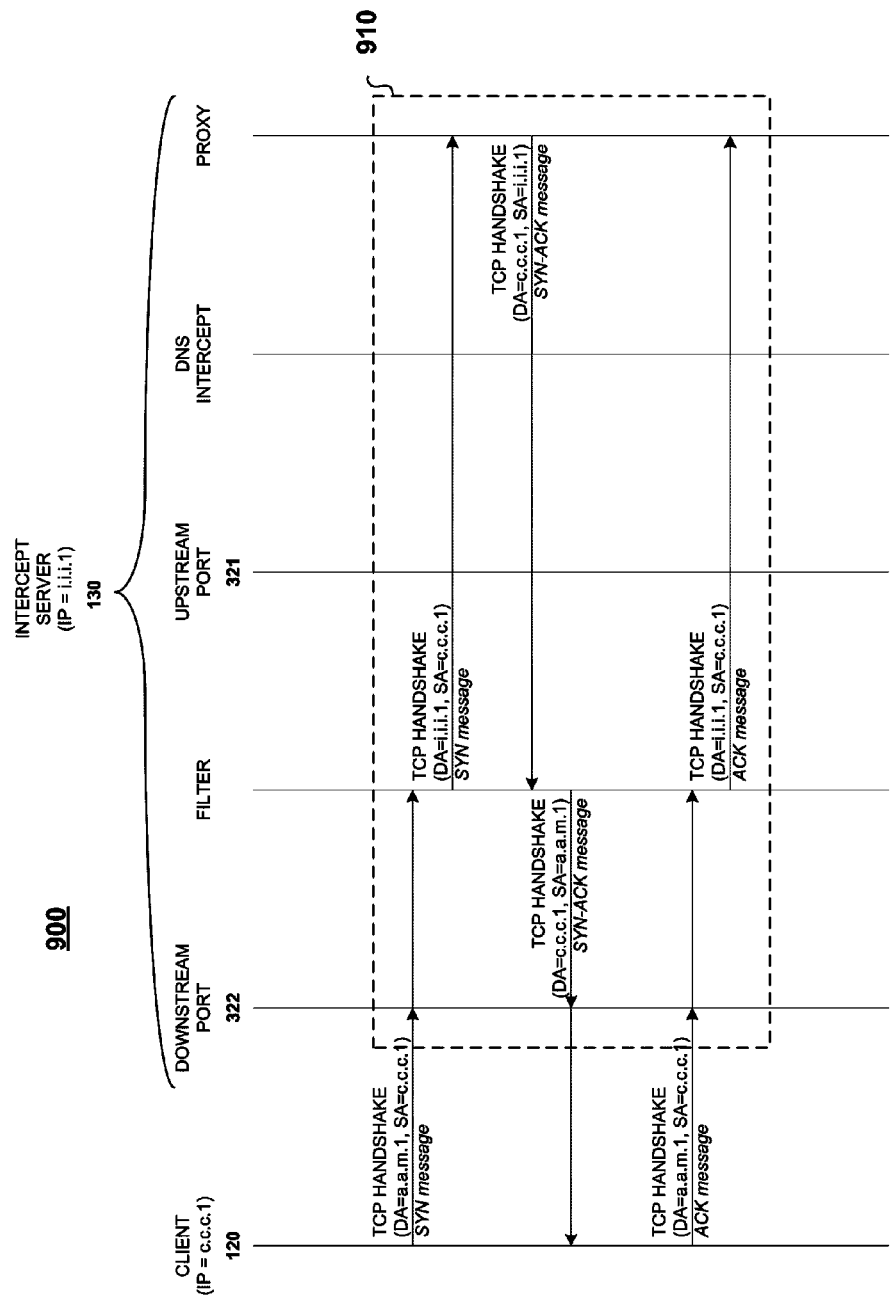
Fig. 9 – TCP HANDSHAKE INTERCEPT

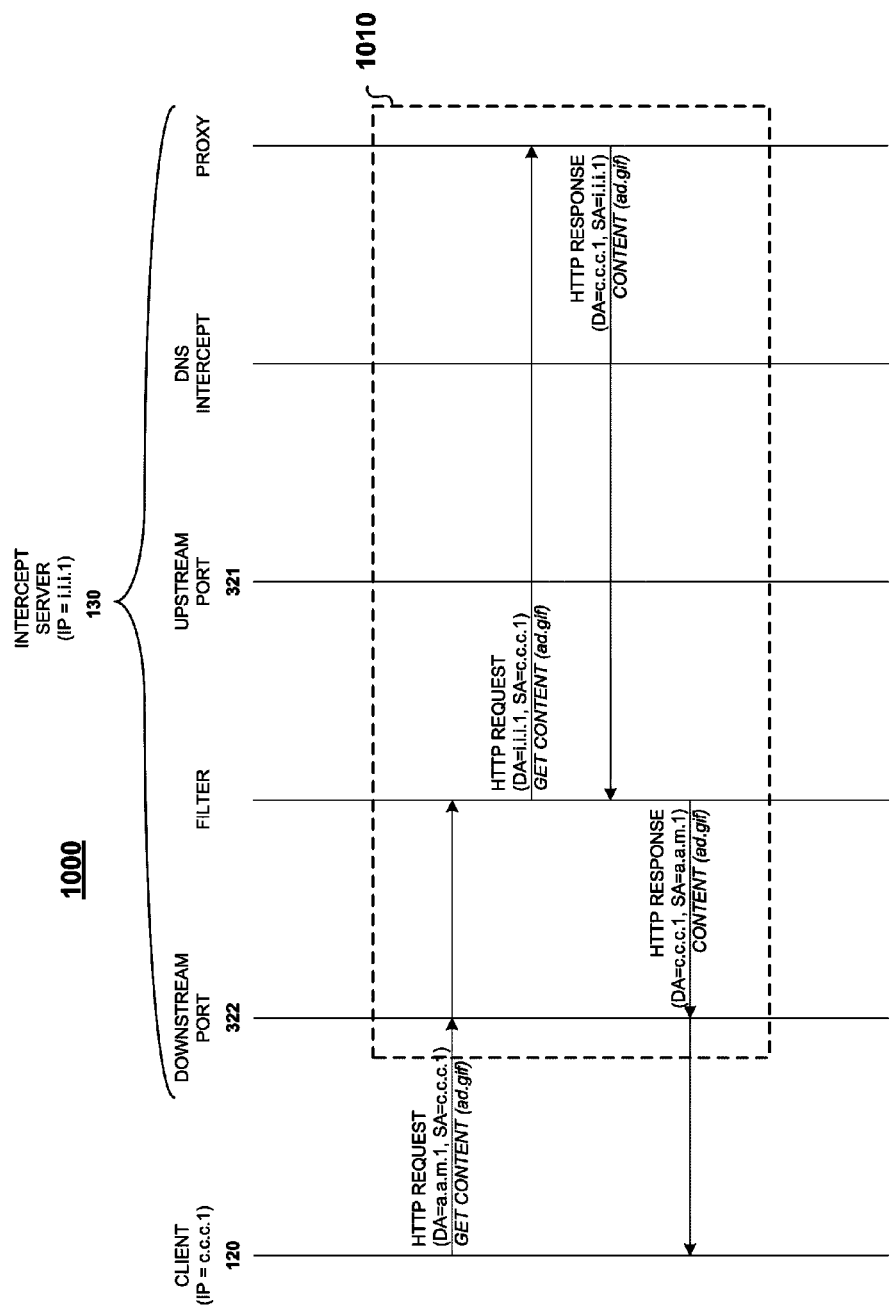
Fig. 10 – CONTENT IN CACHE

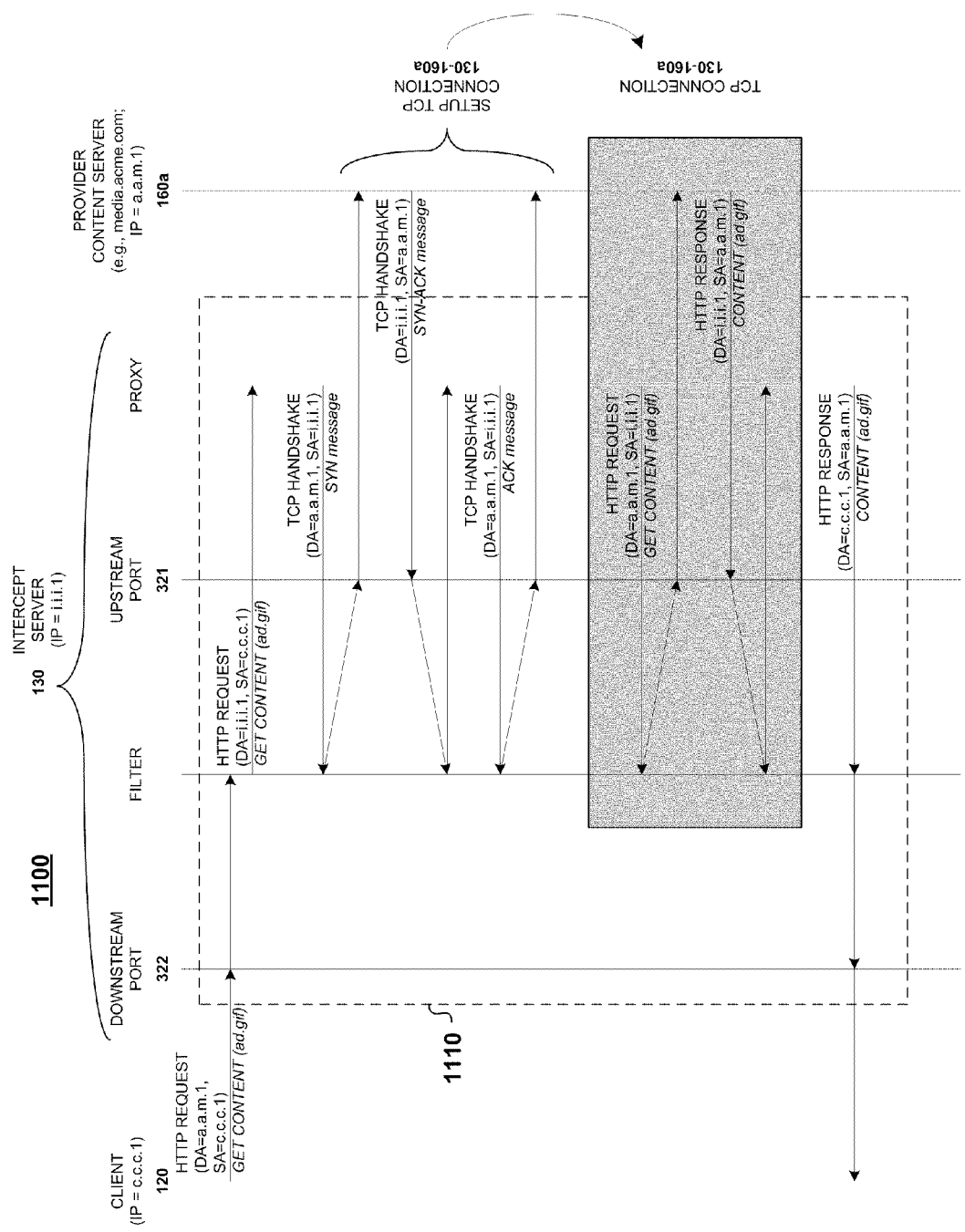
Fig. 11 – CONTENT NOT IN CACHE

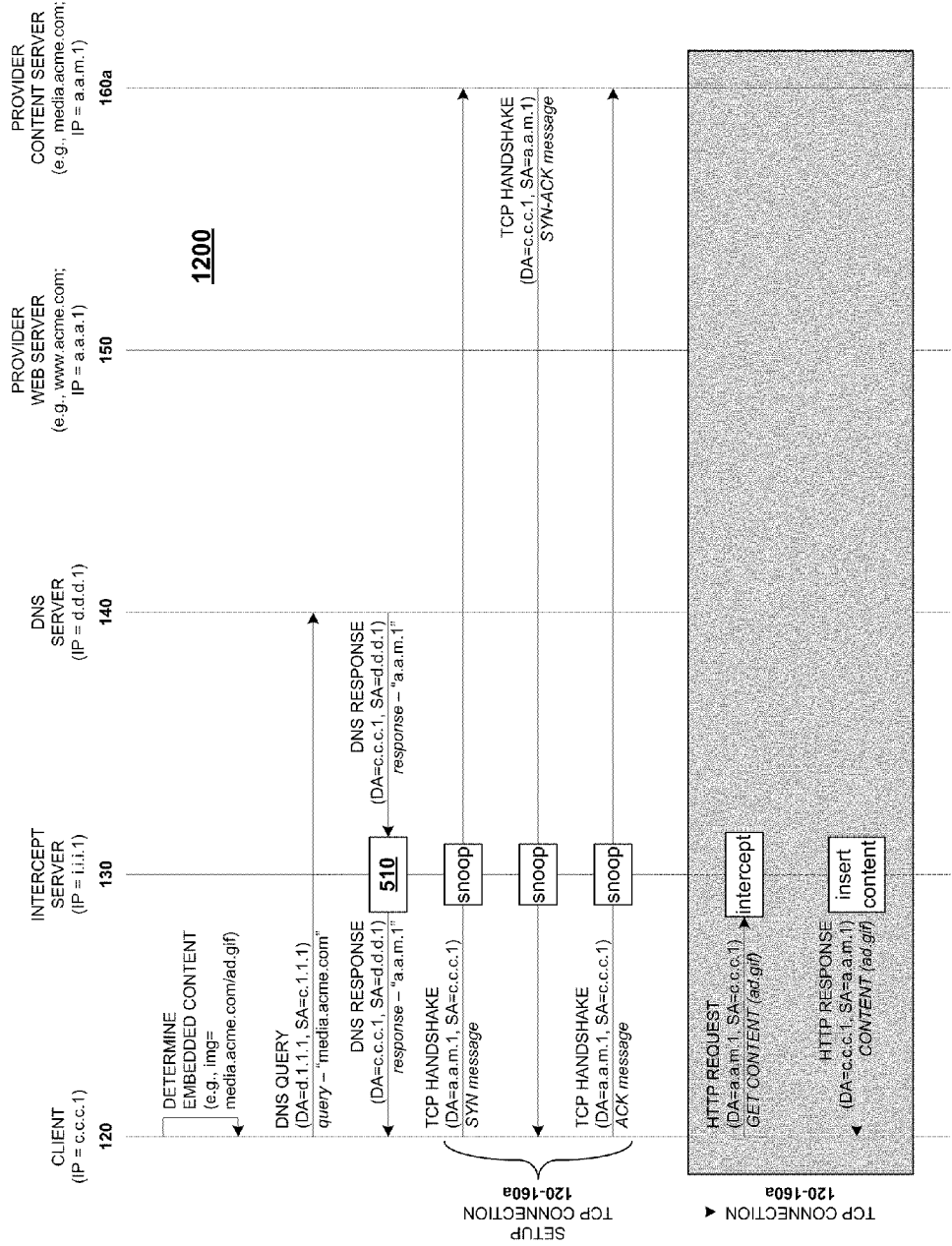
Fig. 12A – CONTENT DELIVERY

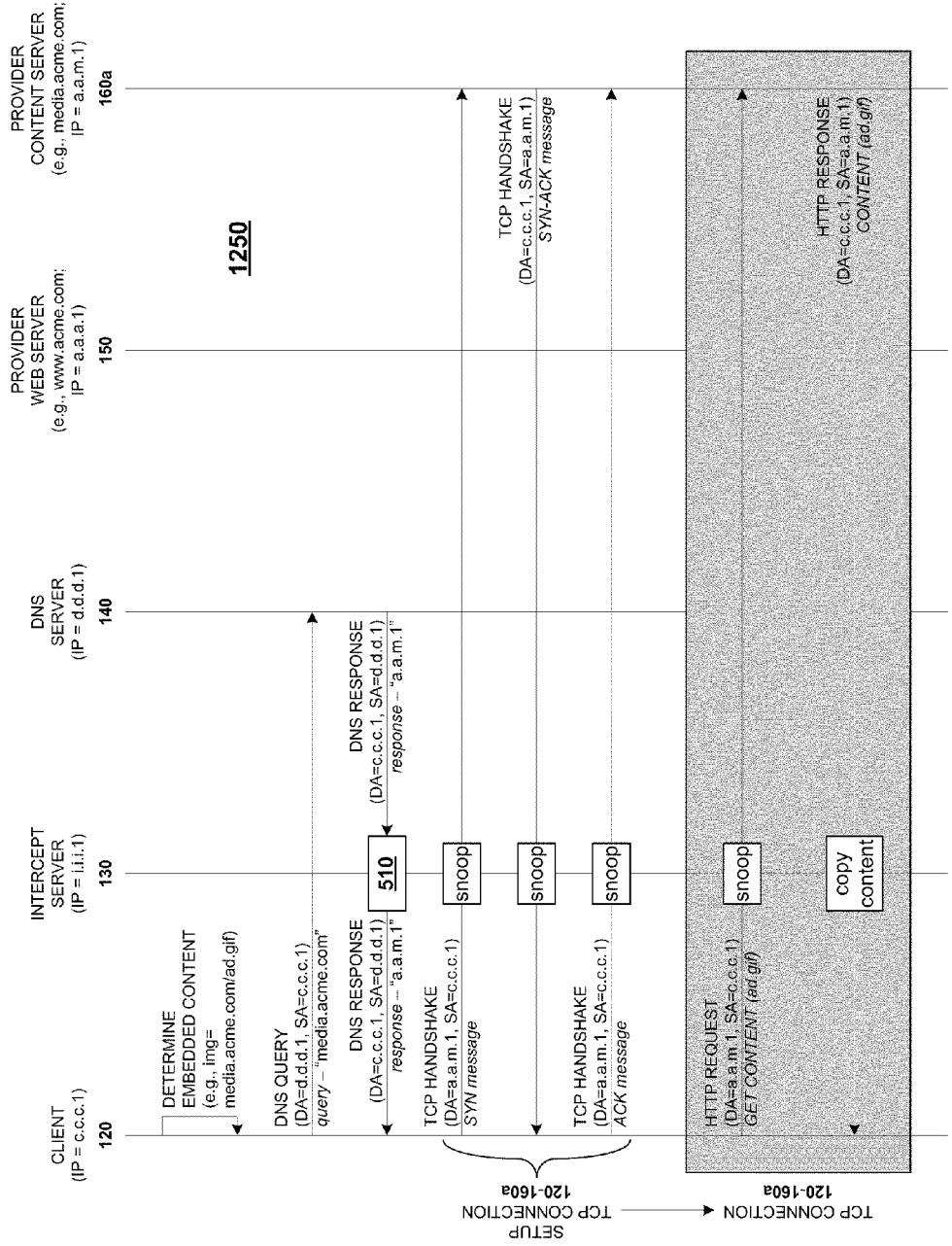
Fig. 12B – CONTENT DELIVERY

INTERCEPT DEVICE FOR PROVIDING CONTENT

RELATED APPLICATIONS

This application claims priority to and the benefit of U.S. Provisional Patent Application No. 61/116,273, filed on Nov. 19, 2008, the entire contents of which is incorporated herein by reference in its entirety.

FIELD OF THE INVENTION

The present invention relates to a computer-implemented method, a computer program product and an apparatus for network virtualization. In one aspect, requests for content are intercepted and a response is generated based on locally cached content.

BACKGROUND

A distributed computing platform can serve content to clients from a central content provider's server and from local content provider servers. Content can include text, web pages and/or media objects such as, for example, audio, video, images, graphics, advertisements, animation, and read only data. Typically, a web page requested by a client is delivered by the central content provider. The web page includes links or pointers to media objects hosted on local servers. The web page can be in a mark up language, such as HTML, and can include links to local content provider servers, e.g., network paths to a local server identified by a uniform resource locator (URL). One or more levels of domain name service (DNS) servers can determine the client location and identify a local server to deliver the media objects.

Typically, if a plurality of clients on the same communications network request the same content from the central or local content provider servers, then separate requests must be sent from each client to one or more of the content provider servers to retrieve the requested content, and a separate copy of the requested content must be communicated back to each of the requesting clients.

SUMMARY OF THE INVENTION

One approach to minimizing the utilization of upstream networks is to provide cached content at an intercept device that virtualizes the upstream networks. In one aspect, there is a computerized method for network virtualization. The method includes receiving, via a first physical port of an intercept device coupled to a first communications network, a DNS response message from a DNS server on the first communications network. The DNS response includes a domain name, a network address associated with the domain name, and a destination address of a first network device on a second communications network. The method also includes determining whether the domain name satisfies a DNS intercept criterion. The method also includes, if the domain name satisfies the DNS intercept criterion, updating a request intercept criterion to include the network address associated with the domain name. The method also includes transmitting, via a second physical port of the intercept device that is coupled to the second communications network, the DNS response message to the first network device. The method also includes receiving, via the second physical port, a request for service from the first network device that is addressed to a second network device on a third communications network. The method also includes determining whether the request for service satisfies the request intercept criterion. The method also includes, if the request for service satisfies the request intercept criterion, (1) generating a response to the request for service and (2) transmitting the generated response to the first network device. The generated response includes data indicating that the generated response originated from the second network device. The method also includes, if the request for service does not satisfy the request intercept criterion, transmitting the request for service to the second network device via a third physical port coupled to the third communications network.

In another aspect, there is a system for virtualizing a network. The system includes a first physical port coupled to a first communications network, a second physical port coupled to a second communications network, a third physical port coupled to a third communications network, and a control processor. The control processor includes a computing means for receiving, via the first physical port, a DNS response message from a DNS server on the first communications network. The DNS response includes a domain name, a network address associated with the domain name, and a destination address of a first network device on a second communications network. The control processor also includes a computing means for determining whether the domain name satisfies a DNS intercept criterion. The control processor also includes a computing means for updating a request intercept criterion to include the network address associated with the domain name, if the domain name satisfies the DNS intercept criterion. The control processor also includes a computing means for transmitting, via the second physical port, the DNS response message to the first network device. The control processor also includes a computing means for receiving, via the second physical port, a request for service from the first network device that is addressed to a second network device on a third communications network. The control processor also includes a computing means for determining whether the request for service satisfies the request intercept criterion. The control processor also includes a computing means for, if the request for service satisfies the request intercept criterion: (1) generating a response to the request for service and (2) transmitting the generated response to the first network device. The generated response includes data indicating that the generated response originated from the second network device. The control processor also includes a computing means for transmitting, via the third physical port, the request for service to the second network device, if the request for service does not satisfy the request intercept criterion.

In another aspect, there is a computer program product. The computer program product is tangibly embodied in a machine-readable storage device and includes instructions being operable to cause a data processing apparatus to receive, via a first physical port of an intercept device coupled to a first communications network, a DNS response message from a DNS server on the first communications network. The DNS response includes a domain name, a network address associated with the domain name, and a destination address of a first network device on a second communications network. The computer program product also includes instructions being operable to cause the data processing apparatus to determine whether the domain name satisfies a DNS intercept criterion. The computer program product also includes instructions being operable to cause the data processing apparatus to, if the domain name satisfies the DNS intercept criterion, update a request intercept criterion to include the network address associated with the domain name. The computer program product also includes instructions being operable to cause the data processing apparatus to transmit, via a second physical port of the intercept device that is coupled to the second communications network, the DNS response message to the first network device. The computer program product also includes instructions being operable to cause the data processing apparatus to receive, via the second physical port, a request for service from the first network device that is addressed to a second network device on a third communications network. The computer program product also includes instructions being operable to cause the data processing apparatus to determine whether the request for service satisfies the request intercept criterion. The computer program product also includes instructions being operable to cause the data processing apparatus to, if the request for service satisfies the request intercept criterion, (1) generate a response to the request for service and (2) transmit the generated response to the first network device. The generated response includes data indicating that the generated response originated from the second network device. The computer program product also includes instructions being operable to cause the data processing apparatus to if the request for service does not satisfy the request intercept criterion, then transmit the request for service to the second network device via a third physical port coupled to the third communications network.

In other examples, any of the aspects above can include one or more of the following features. In some embodiments, the domain name can satisfy the DNS intercept criterion if the domain name is included in an intercept table of one or more domain names. The intercept table can be stored on a machine-readable storage medium of the intercept device. The request intercept criterion can be based on an intercept list of Internet Protocol (IP) addresses stored on a machine-readable storage medium of the intercept device. Updating the request intercept criterion to include the network address associated with the domain name can include adding the network address to the intercept list of IP addresses. Updating the request intercept criterion to include the network address associated with the domain name can include adding the network address to the intercept list of IP addresses. The request for service can satisfy the request intercept criterion if the destination address associated with the request for service is included in the intercept list of IP addresses.

In some embodiments, the request for service can include a request to retrieve content. The content can include graphical content, video content, audio content, or any combination thereof. The request to retrieve content can include an HTTP GET request. The generated response can include the content. The computerized method can further include retrieving the content from a machine-readable content database locally connected to the intercept device.

In some embodiments, the request for service can include a request to setup a TCP connection between the first network device and the second network device. The generated response can include a TCP handshake message. The generated response can include two or more response messages including the requested service. One or more intermediate communications networks can separate the first communications network from the first physical port, the second communications network from the second physical port, and/or the third communications network from the third physical port. The first and third communications networks can be the same. The first and third physical ports can be the same. The second communications network can include an access network for one or more user devices and the third communications network comprises a core network.

Any of the above implementations can realize one or more of the following advantages. Snooping on DNS response messages at an intermediate location can advantageously allow the intercept device to determine and/or maintain up-to-date IP addresses for one or more given domain names provided in a domain name database without having to expend additional resources of initiating its own DNS queries to the DNS server. Intercepting content requests downstream from a content server and providing the content from a local cache or storage database of an intercept device can advantageously allow for more efficient utilization of upstream network resources. In addition, by providing the content closer downstream, the response time for serving the content to one or more requesting clients can advantageously be minimized resulting in faster connection speeds for users. If requested content is not included in the content database, then the intercept device can advantageously retrieve a copy of the content and store the content to the content database for future requests by one or more other client devices for the same content. In some embodiments, providing for fault resiliency in the intercept device can advantageously allow continuous and un-interrupted communications in case part of the intercept device fails. Horizontal scaling of two or more intercept devices can advantageously provide for additional fault resiliency in case one of the intercept servers in the series fails.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other features and advantages of the present invention, as well as the invention itself, will be more fully understood from the following description of various embodiments, when read together with the accompanying drawings.

FIGS. 5A-5B are ladder diagrams illustrating DNS snooping of DNS response messages, according to illustrative embodiments of the invention.

FIG. 6 is a ladder diagram illustrating unfiltered delivery of web pages, according to an illustrative embodiment of the invention.

FIG. 7 is a ladder diagram illustrating unfiltered content delivery, according to an illustrative embodiment of the invention.

FIGS. 8A-8B are ladder diagrams illustrating filtered content delivery, according to an illustrative embodiment of the invention.

FIG. 9 is a ladder diagram illustrating intercepting a TCP handshake, according to an illustrative embodiment of the invention.

FIG. 10 is a ladder diagram illustrating delivery of content when it is in the local database, according to an illustrative embodiment of the invention.

FIG. 11 is a ladder diagram illustrating delivery of content when it is not in the local database, according to an illustrative embodiment of the invention.

FIGS. 12A-12B are ladder diagrams illustrating filtered content delivery, according to an illustrative embodiment of the invention.

DETAILED DESCRIPTION

Figure 1:
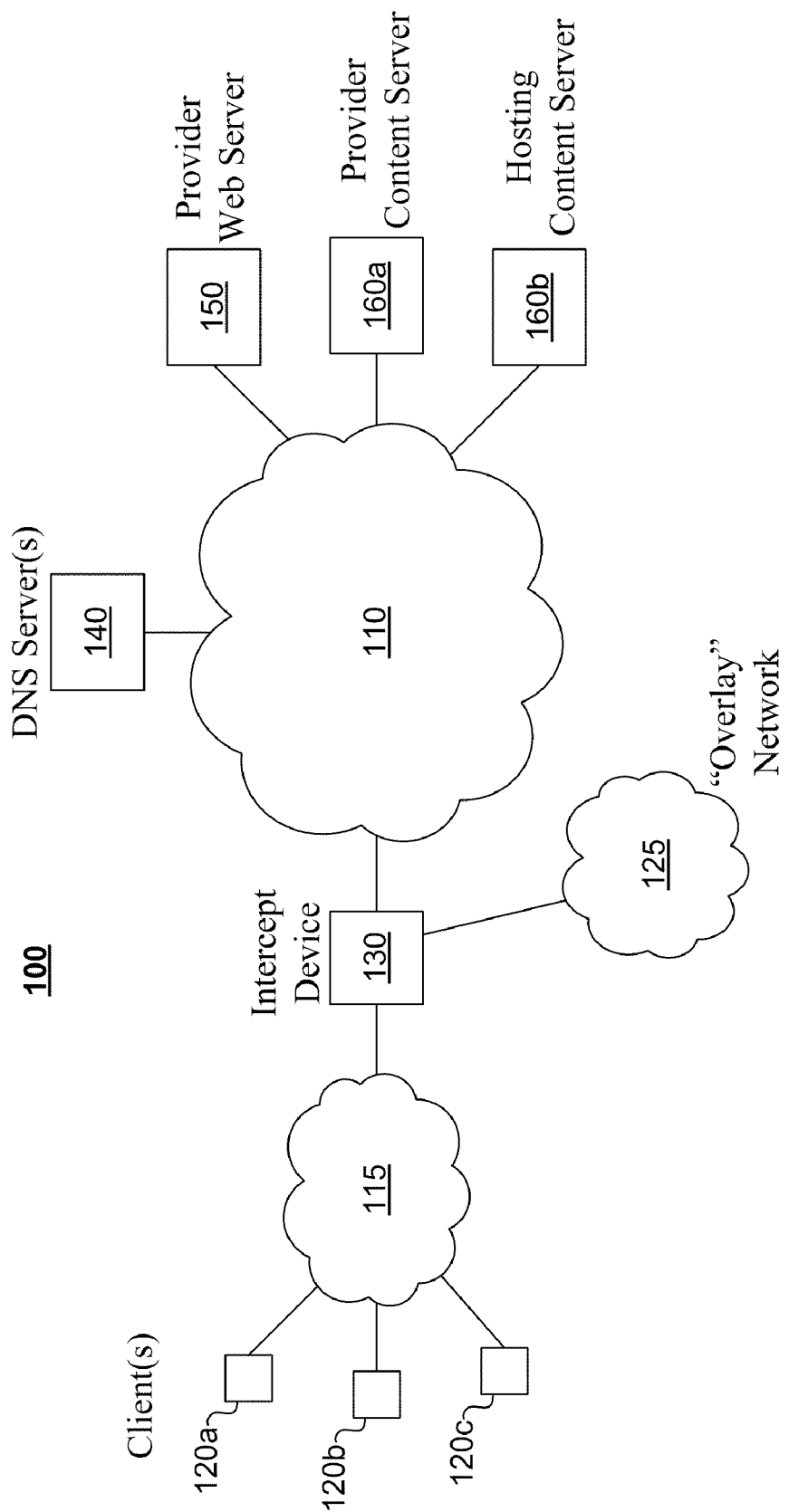
FIG. 1 is a block diagram showing an exemplary network with devices relating to network virtualization, according to an illustrative embodiment of the invention.
Figure 13:
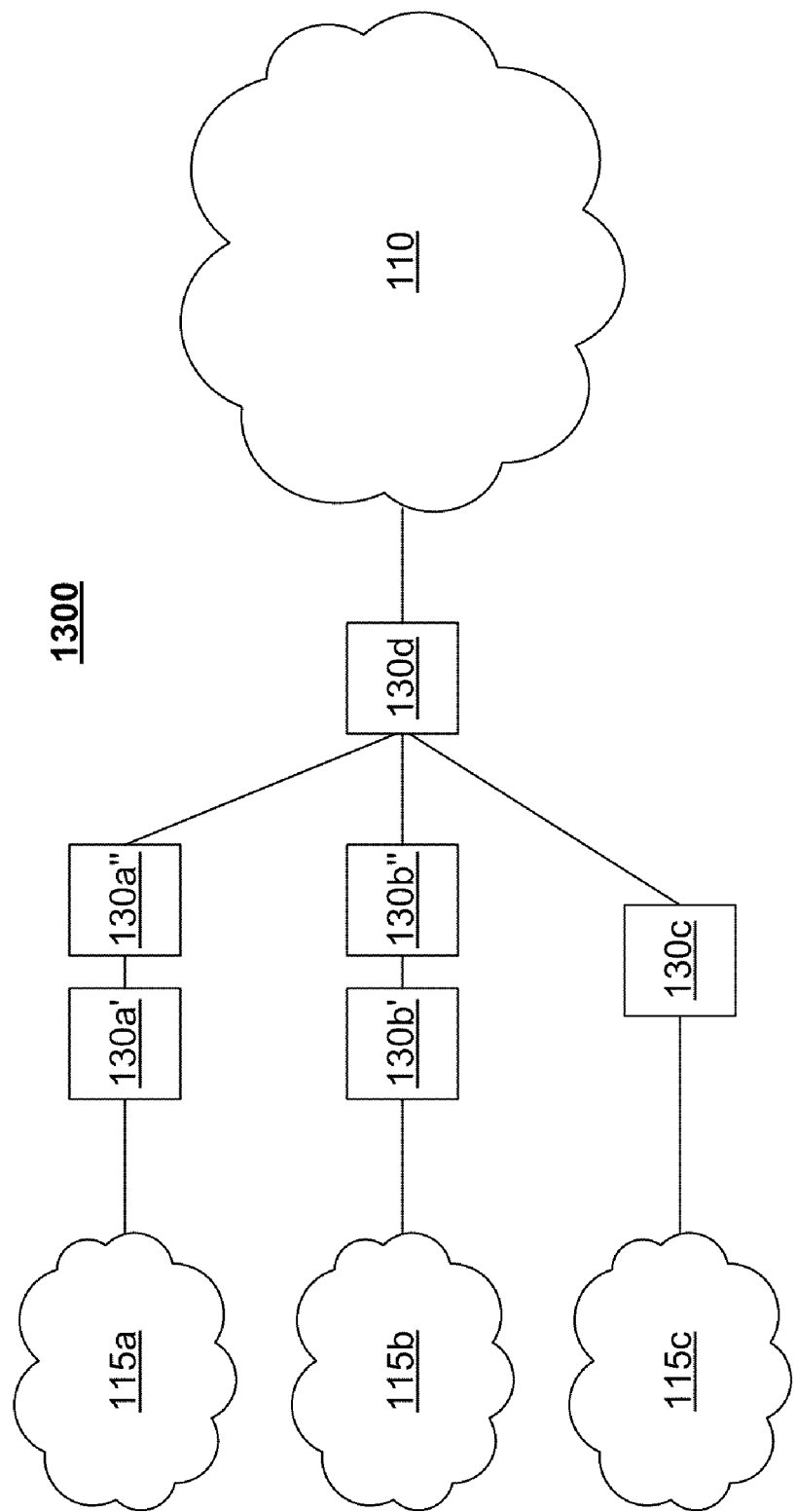
FIG. 13 is a block diagram illustrating an overlay network, according to an illustrative embodiment of the invention.

FIG. 1 is a block diagram showing an exemplary network 100 with devices relating to network virtualization, according to an illustrative embodiment of the invention. The network 100 includes transmission mediums 110 and 115, one or more clients 120a, 120b, and/or 120c, generally 120, an overlay network 125, an intercept device 130, at least one Domain Name System (DNS) Server 140, at least one provider web server 150, and one or more content servers 160a and/or 160b, generally 160. The transmission mediums 110 and 115 (e.g., communications network) are responsible for the transfer of information, including requests for services, between one or more clients 120 and/or servers 140, 150, 160. As described in more detail below, the intercept device 130 can be configured according to some of the inventive techniques described herein. The overlay network 125 can include one or more additional intercept devices as illustrated in FIG. 13.

The clients 120 can be any device(s) capable of requesting one or more services from servers 140, 150, and/or 160. The clients 120 can include user devices such as computers, televisions, mobile devices (e.g., smart phones, laptop computers, and/or the like), and/or other communication devices. The clients 120 can be identified by a unique identifier such as, for example, an Internet Protocol (IP) address.

In some embodiments, the intercept device 130 can be located at a headend facility (e.g., a cable television headend). In supplemental or alternative embodiments, the intercept device 130 can be located at a node in the "last mile" or other access network for one or more client devices 120. In general, the intercept device 130 can be located at any node between a client device 120 and the servers 150 and/or 160. In some embodiments, the downstream access path via the one or more ports 212 are the only communication path available for a client 120 to access services provided by the servers 150 and/or 160.

The DNS server 140 can be responsible for providing responses to DNS Query messages as defined by the Internet Engineering Task Force (IETF) in Request for Comment (RFC) Nos. 882, 883, 1034, 1035, and/or other RFCs. The clients 120 can send a DNS Query message that includes the domain name of a particular service in order to determine the IP address to use in addressing requests for that particular service. For example, if client 120a would like to request a service (e.g., download a web page) from the domain name "www.acme.com," then the client 120a can send a DNS Query message to the DNS server 140. The DNS Query message can include an IP destination address of the DNS server 140 and an IP source address of the client 120a so that the DNS server 140 knows where to send the response. The DNS server 140, in turn, can translate the domain name included in the DNS Query message into the numerical identifier (e.g., IP address) associated with "www.acme.com." The numerical identifier is included in a DNS Response message that is sent back to the requesting client 120a.

The provider web server 150 can provide web hosting services for one or more web pages. For example, upon request (e.g., an HTTP REQUEST), the provider server 150 can transmit web page documents (e.g., documents in HTML, ASP, and/or other web page formats) back to a requesting client 120. Typically, web page documents can include one or more links (e.g., uniform resource locator (URL) links) that instruct the client 120 how to request and retrieve one or more additional services. Additional services can be provided by content servers 160 and can include, for example, image services (e.g., images in JPG, GIF, BMP, and/or other image formats), audio services (e.g., audio files in WAV, MPG, and/or other audio formats), video services (e.g., MPG, WMV, AVI, Flash Video (FLV), and/or other video formats), multimedia services, other electronic services, and/or any combination thereof.

In some embodiments, a web browser application executing on the client device 120 can aggregate the retrieved content from the requested services and display the information on a visual display device (not shown). In some embodiments, a provider of web services can host web page documents (e.g., HTML documents) on the provider web server 150 (e.g., www.acme.com) and the content associated with the web page documents (e.g., embedded images) on the provider content server 160a (e.g., media.acme.com). The provider content server 160a can be centrally located and act as the master repository for the media associated with the web services. In supplemental or alternative embodiments, hosting content servers 160b can be geographically distributed and host mirrored media content from the provider content server 160a. The DNS servers 140 can be modified to point translation requests for central content provider servers 160a (e.g., media.acme.com) to the nearest hosting content server 160b. FIG. 1 illustrates provider web server 150 to be different from content servers 160, but other configurations can also be used. For example, provider web server 150 can be hosted on the same network device as one or more content servers 160.

Figure 2:
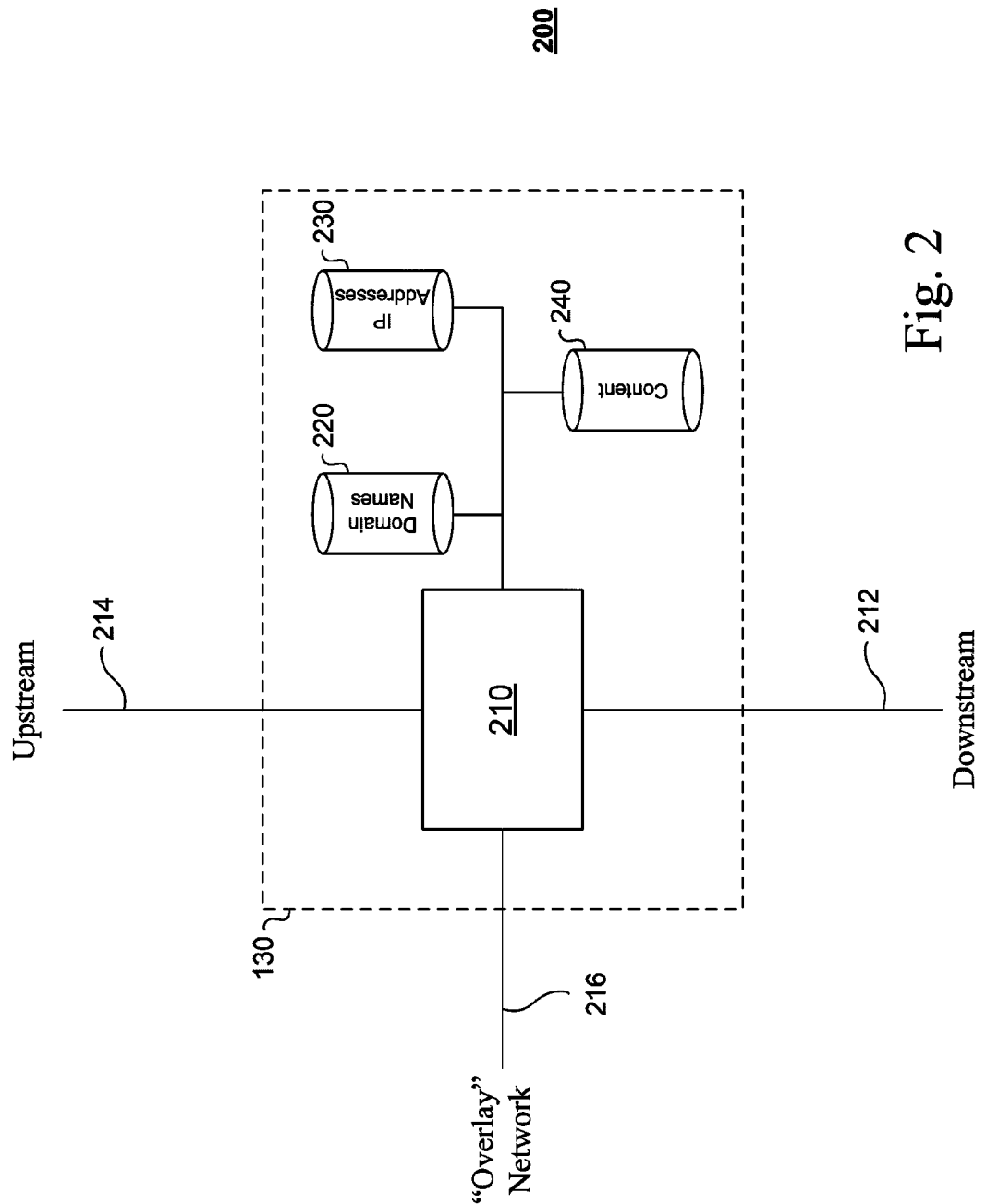
FIG. 2 is a block diagram showing the components of an exemplary intercept device, according to an illustrative embodiment of the invention.

FIG. 2 is a block diagram 200 showing the components of an exemplary intercept device 130, according to an illustrative embodiment of the invention. The intercept device 130 can include one or more downstream physical ports 212 coupled to the transmission medium 115, one or more upstream physical ports 214 that are coupled to the transmission medium 110, and/or one or more physical ports 216 coupled to the overlay network 125. The intercept device 210 includes a switching device 210, a domain name database 220, an IP address database 230, and/or a content database 240. FIG. 2 illustrates the databases 220, 230, and 240 to be separate databases, but other configurations can also be used. For example, a portion or all of the information stored on these databases can be stored on one or more of the same databases. In supplemental or alternative embodiments, the databases can be locally coupled to the switching device 210 (e.g., in one or more rack mounts).

The domain name database 220 can include, for example, one or more known domain names (e.g., in a text format such as ASCII) that the intercept device 130 has been programmed to intercept and/or cache data for. In some embodiments, the domain name database 220 can be programmed manually either locally or remotely over one of the communications networks. The IP address database 230 can include one or more IP addresses (e.g., in a text or binary format) associated with the one or more domain names in the domain name database 220. In some embodiments, associations can be made by using pointer information (e.g., a domain name can include the location that its associated known IP addresses are stored at in the database 230). In alternative or supplemental embodiments, the associations can be made using a table. Table I below illustrates an example of associations between domain names and IP address (the IP addresses listed below and throughout this specification use alphabet characters for illustration purposes only):

TABLE I

Domain Name to IP Associations

| | |
|---|---|
| www.acme.com | a.a.a.1; a.a.a.2 |
| www.abccompany.com | |
| www.123company.com | a.1.2.3 |
| media.acme.com | a.a.m.1 |
| media.123co.com | a.1.2.m1; a.1.2.m2 |

In Table 1, some domain names are associated with more than one IP address, while some domain names have yet to be associated with a particular IP address.

The content database 230 can include content including, but not limited to, web page documents, image content, audio content, video content, multimedia content and/or other content as described above. The content database can further include a control file that maps or associates URLs or other identifiers with the locations of the stored content. Table II below illustrates an example of a control file:

TABLE II

Control File

| | |
|---|---|
| media.acme.com/products.html | <database location> |
| media.acme.com/advertisement1.jpg | <database location> |
| media.acme.com/advertisement2.jpg | <database location> |
| media.acme.com/commercial.mpg | <database location> |
| media.acme.com/commercial.flv | <database location> |
| media.123co.com/image1.tiff | <database location> |
| media.123co.com/image2.tiff | <database location> |
| media.123co.com/songs/song.wav | <database location> |

The intercept device 130 can use the information stored in the IP address database 230 to make determinations on whether to intercept messages received on the downstream 212 physical ports. For example, a request intercept criterion can include intercepting all packets with a destination IP address included in the IP address database 230.

Figure 3:
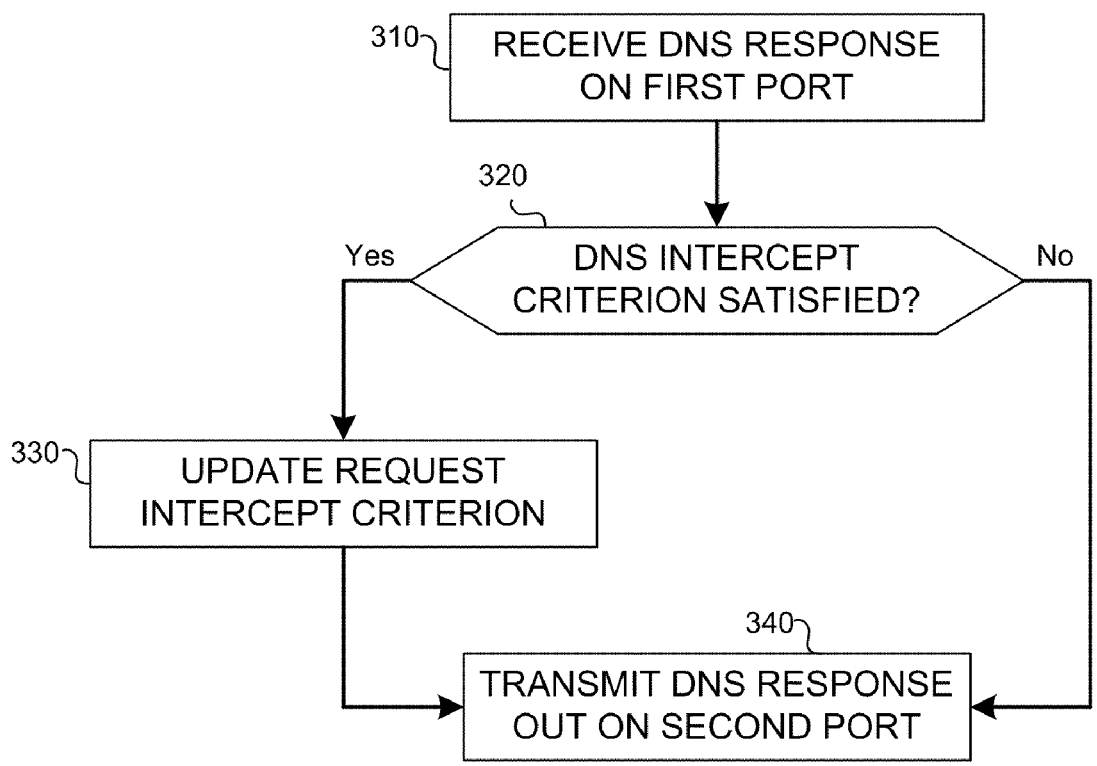
FIG. 3 is a flowchart depicting generation of a request intercept criterion, according to an illustrative embodiment of the invention.

FIG. 3 is a flowchart 300 depicting generation of the IP addresses used for a request intercept criterion, according to an illustrative embodiment of the invention. The elements of the flowchart 300 are described using the exemplary network devices of FIGS. 1 and 2. Generation of the IP addresses includes receiving, via one of the physical upstream ports 214, a DNS response message (310), determining whether a domain name in the DNS response message satisfies a DNS intercept criterion (320), if the domain name satisfies the DNS intercept criterion, then updating a request intercept criterion to include the network address associated with the domain name (330), and transmitting, via one of the physical downstream ports 212, the DNS response message to one of the client network devices 120 (340).

Receiving (310) and/or transmitting (340) messages, via one of the physical ports, can be accomplished, for example, using a physical layer and/or data link layer protocol (e.g., using one or more of an Ethernet protocol, a SONET/SDH protocol, an ATM protocol, and/or other physical and link layer protocols).

In some embodiments, the DNS response message was sent from the DNS server 140 in response to a DNS query message initated by the client device 120. DNS response messages typically include a domain name and a network address associated with the domain name. DNS response messages also can include a destination address of the client network device 120 that initiated the DNS query. Determining whether the DNS intercept criterion is satisfied (320) can include, for example, first determining whether the received message is a DNS response message (e.g., by checking the Q-bit field in the DNS message header), and then determining whether a domain name extracted from the body of the DNS message is included in the domain name database 220. In some embodiments, updating the request intercept criterion (330) can include extracting the IP address associated with the matched domain name and adding it to the IP address database 220.

Flowchart 300 advantageously allows the intercept device 300 to determine and/or maintain up-to-date IP addresses for given domain names provided in the domain name database 220 without having to expend additional resources of initiating its own DNS queries to the DNS server 140.

Figure 4A:
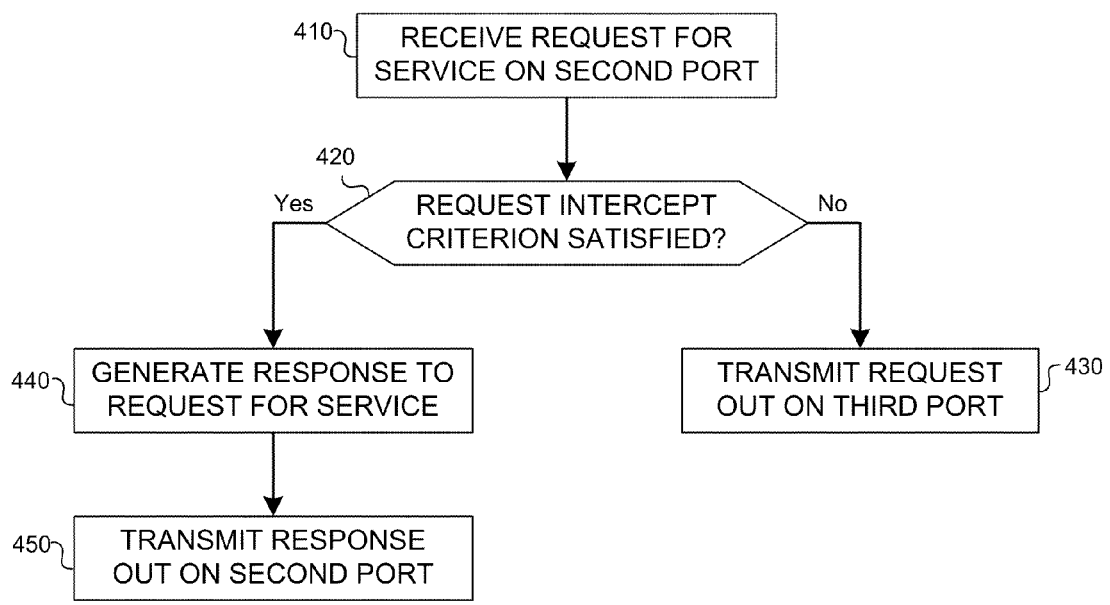
FIGS. 4A-4B are flowcharts depicting content provider network virtualization, according to an illustrative embodiment of the invention.
Figure 4B:
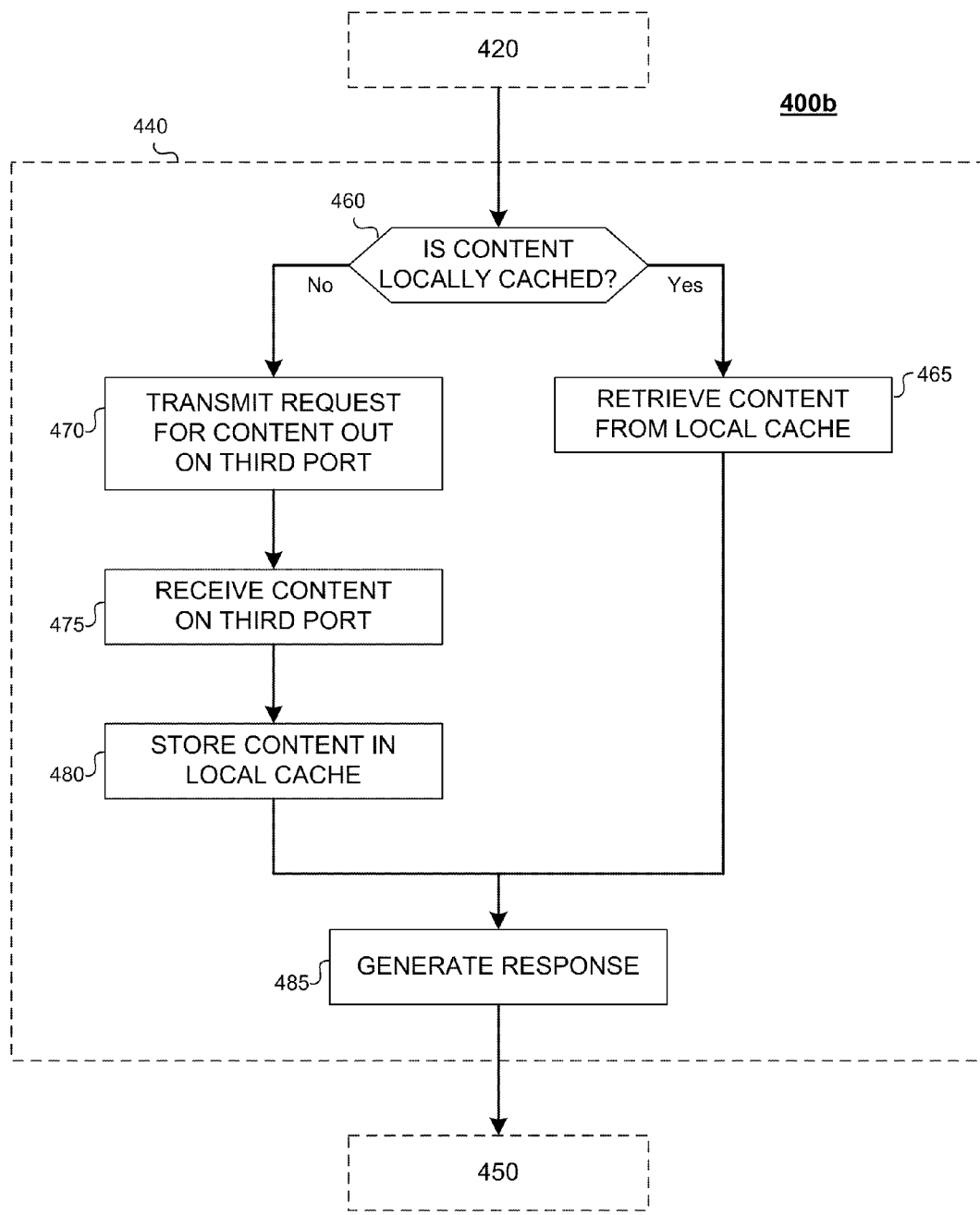

FIGS. 4A-4B are flowcharts 400*a-b* depicting content provider network virtualization, according to an illustrative embodiment of the invention. Network virtualization can refer to the transparent nature of the content retrieval from the client device 120's perspective. For example, the client device 120 may be completely ignorant of the presence of the intercept device 130, even though the intercept device 130 is the network device that is providing the content as described below. The elements of the flowcharts 400*a-b* are described using the exemplary network devices of FIGS. 1 and 2. Network virtualization addresses includes receiving, via one of the physical downstream ports, a request for service from a network device 120 (410), determining whether the request for service satisfies a request intercept criterion (420), if the request for service does not satisfy the request intercept criterion, then transmitting the request for service, via one of the physical upstream ports 214, to the request's intended destination (430), if the request for service satisfies the request intercept criterion, then generating a response to the request for service (440) and transmitting, via one of the downstream physical ports 212, the generated response to the network device 120 that requested the service (450).

Receiving (410) and/or transmitting (430) and (450) messages, via one of the physical ports, can be accomplished, for example, using a physical layer and/or data link layer protocol (e.g., using one or more of an Ethernet protocol, a SONET/SDH protocol, an ATM protocol, and/or other physical and link layer protocols). In some embodiments, a request for service can include a request for content message such as, for example, an HTTP GET request. In other embodiments, a request for service can include a request to setup a Transmission Control Protocol (TCP) or a Stream Control Transmission Protocol (SCTP) connection between the network device 120 and the sever device 150 or 160. For example, the request for service can include a TCP Handshake message such as a SYN message.

The received request for service can include a destination IP address indicating one of the servers 150 or 160. Determining whether the request intercept criterion is satisfied (420) can include, for example, extracting the destination IP packet from packets received on the downstream physical ports and matching the extracted IP address to the IP addresses stored in the IP address database 230. In some embodiments, if the extracted IP address matches an IP address in the database 230, then the request intercept criterion is satisfied. In supplemental or alternative embodiments, satisfaction of the request intercept criterion can also require certain time limitations (e.g., at certain periods of the day and/or if a time stamp associated with the IP address stored in the database 230 is under a predetermined time value).

The response generated (440) by the intercept device 130 can include data indicating that the generated response originated from the server device 150 or 160 for which the request for service was originally destined. For example, the IP source address in the generated response message can be made to equal the IP address that matched the intercept criterion as described above. If the request for service is a request for content, then the generated response can include the request response. In some embodiments, the generated response can include more than one packet of information. If the request for service is a request to setup a connection, then the generated response can include a TCP Handshake message such as a SYN-ACK message.

In some embodiments, generating the response message (440) can include determining whether the requested content is locally stored in the content database 240 (460), if the content is locally stored, then retrieving the content from the content database 240 (465), if the content is not included in the content database, then transmitting a request for the requested content, via one of the upstream physical ports 214, to a server network device 150 or 160 (470), receiving, via one of the upstream physical ports 214, the requested content from the server network device 150 or 160 (475), storing the received content in the content database 240 (480), and/or generating the response to the original request for content (485).

In some embodiments, determining whether the requested content is locally stored in the content database 240 (460) can be accomplished by using the control file illustrated in Table II above. For example, if the request for content includes an HTTP GET request including a request for "media.123co.com/songs/song.wav," then the intercept device 130 can perform a lookup in the control file for this URL and if it is present retrieve the content (465) located at the database location referenced by the URL. Providing content in this fashion closer downstream to the requesting network device 120 then the servers 150 or 160 can advantageously allow for more efficient utilization of upstream network resources. In particular, in some embodiments, the upstream network does not have to be utilized at all in transmitting the content to the client device 120. In addition, by providing the content closer downstream, the response time for serving the content to the client 120 can advantageously be minimized resulting in faster connection speeds for users. If the content is not included in the content database, then the intercept device 130 can advantageously retrieve a copy of the content and store the content to the content database 240 (470, 475, 480) for future requests by one or more other client devices 120 for the same content.

FIG. 5A is a ladder diagram 500 illustrating DNS snooping of DNS response messages, according to an illustrative embodiment of the invention. A DNS response message is received at the upstream port 321 of the intercept device 130. The DNS response message includes, in its body, the IP address "a.a.m.1" for the domain name "media.acme.com." The DNS response message is forwarded to a filter, which determines that the received message is a DNS response message and subsequently forwards a copy of the DNS response message to a DNS intercept application. The DNS intercept application determines that the domain name "media.acme.com" is included in the domain name database 220 and requests a Rule Update to add the IP address "a.a.m.1" to the IP address database 230, and instructs the filter to resume the DNS response message. In this case, the DNS response message that is transmitted out the downstream port 322 is identical to the DNS response message received on the upstream port 321, such that the client 120 has no knowledge that the intercept server device 130 snooped on the DNS response message.

FIG. 5B is a ladder diagram 550 illustrating DNS snooping of DNS response messages, according to another illustrative embodiment of the invention. The ladder diagram 550 is similar to the ladder diagram 500, except that the DNS response message transmitted out the downstream port 322 is modified such that the IP address associated with the domain name "media.acme.com" is changed to be the IP address of the intercept server device 130, which is "i.i.i.1." In this manner, the intercept server device 130 is masquerading as "media.acme.com" from the perspective of the client 120 and all subsequent requests for service for media.acme.com can be sent to the intercept server device 130 and processed automatically by virtue of the IP destination address being that of the intercept device itself.

FIG. 6 is a ladder diagram 600 illustrating unfiltered delivery of web pages, according to an illustrative embodiment of the invention. A user at the client device 120 first enters the domain name web address "www.acme.com" into their web browser. A DNS lookup is initiated in which a DNS response is returned with the IP address "a.a.a.1." The intercept service device 130 can execute the ladder diagram 510 in order to update its internal tables. Next, the web browser application on the client device 120 initiates a TCP connection between 120 and the provider's web server 150 that is associated with the IP address "a.a.a.1." Once the TCP connection is established, a HTTP GET request is sent in order to retrieve the HTML document for the web page.

FIG. 7 is a ladder diagram 700 illustrating unfiltered content delivery, according to an illustrative embodiment of the invention, which continues from the example given in FIG. 6. After the web page is downloaded by the web browser, it processes the HTML document to determine if any content is embedded. For example, the HTML can include the code "img=media.acme.com/ad.gif," which indicates that a GIF image should be downloaded from the given URL location. The client device initiates a DNS lookup if necessary, sets up the appropriate TCP connection, and transmits a HTTP GET request for the specified image.

In the ladder diagrams 600 and 700, the intercept device 130 is set in a bypass mode such that it does not intercept any requests for service. In some embodiments, the intercept device 130 can be configured and/or programmed to have a bypass mode for fault resiliency purposes. Providing for fault resiliency advantageously allows continuous and un-interrupted communications in case part of the intercept device 130's components fail (e.g., the switching device 210 and/or one of the databases). In some embodiments, a fail-safe passive optical switch can provide for un-interrupted communication that allows the requests from client devices 120 to flow upstream through the failed intercept device 130.

FIGS. 8A-8B are ladder diagrams 800 and 850 illustrating filtered content delivery, according to an illustrative embodiment of the invention. Ladder diagram 800 illustrates an example where the requested content is stored locally (465). When the client device 120 attempts to setup a TCP connection with the content server 160a at IP address "a.a.m.1," the intercept server device 130 can spoof the TCP connection, as illustrated in FIG. 9. In this case, the client device 120 believes it is communicating with the content server 160a, but is really communicating with the intercept server 130 masquerading as the content server 160a. Once the TCP connection is setup, the intercept server 130 intercepts all packets associated with that connection including subsequent HTTP GET REQUESTS. As FIG. 10 illustrates, if the content is locally stored, then the intercept server 130 generates a HTTP RESPONSE message and transmits to the requesting client 120.

Ladder diagram 850 illustrates an example where the requested content is not stored locally (460). In this example, the intercept server 130 sets up a TCP connection with the intended server 160a acting as itself (i.e., the source address used is that of the intercept device itself) and subsequently requests the content as illustrated in FIG. 11. In an alternative embodiment, the intercept server 130 can setup a TCP connection with the server 160a masquerading as the client device 120, in which case the content provider 160a believes it is communicating with the client 120 but is really communicating the intercept server 130.

FIG. 9 is a ladder diagram 900 illustrating intercepting a TCP handshake, according to an illustrative embodiment of the invention. TCP setup can include a three-step setup of receiving a SYN message, sending a SYN-ACK message, and receiving an ACK message. As the ladder diagram 900 illustrates, the filter intercepts the SYN and ACK messages because they satisfy the request intercept criterion (e.g., they include destination IP address "a.a.m.1" that match an intercept IP address included in the IP address database 230). In addition, the filter modifies the source address of the downstream SYN-ACK message to be that of "a.a.m.1," such that the client 120 believes it is communication with the server 160a.

FIG. 10 is a ladder diagram 1000 illustrating delivery of content when it is in the local database, according to an illustrative embodiment of the invention. Similar to the ladder diagram 900, the filter intercepts the HTTP REQUEST, because the destination IP address satisfies the request intercept criterion. The HTTP REQUEST is re-routed to a proxy layer that can access the content database 240 to retrieve the requested content—"ad.gif." The proxy layer subsequently generates a HTTP RESPONSE message that includes "ad.gif" and forwards it back to the filter for subsequent transmission to the client device 120.

FIG. 11 is a ladder diagram 1100 illustrating delivery of content when it is not in the local database, according to an illustrative embodiment of the invention. If the proxy layer determines that "ad.gif," the requested content, is not stored in the content database 230, then it sets up a TCP connection with the server 160a as described above with respect to FIG. 9B in order to retrieve the content. When the HTTP RESPONSE including "ad.gif" is finally received by the proxy, it stores the content to a location on the content database 240, record this association in the control file of Table II so that future users can access the same content, and then generate an HTTP Response message including "ad.gif."

FIGS. 12A-12B are ladder diagrams 1200 and 1250 illustrating filtered content delivery, according to alternative illustrative embodiment of the invention. In particular, as the ladder diagrams 1200 and 1250 illustrate, the intercept server device 130 does not masquerade as any device during the TCP connection setup phase. However, the intercept server device 130 can snoop on the messages and maintain internal records of the TCP connection (such as the current sequence number and/or acknowledge number of the TCP connection). In this case, if the intercept server 130 receives a request for content that it has locally stored, then it can terminate the HTTP request from proceeding further upstream and directly respond to the request masquerading as the content server 160a. However, if the content is not locally stored, then the intercept server 130 can merely allow the HTTP request to pass, and when the content is transmitted back to the client device 120 from the content server 160a, then the intercept server 130 can snoop on the response and copy the requested content to the content database 440.

FIG. 13 is a block diagram illustrating an overlay network 1300, according to an illustrative embodiment of the invention. The overlay network 1300 includes one or more additional intercept server devices 130a', 130a", 130b', 130b", 130c, and 130d. In some embodiments, the intercept the system can be scaled horizontally as illustrated by the intercept servers in series (e.g., servers 130b', 130b" and 130d). Horizontal scaling can advantageously provide for additional fault resiliency in case one of the intercept servers in the series fails. Many intercept servers can be present in a single site, but only one maybe expected to be in failed/bypass mode at any point in time. As such, one or more upstream intercept servers can be configured to intercept IP addresses from one or more failed downstream intercept servers. If all of the intercept servers in a series fail, then the content provider servers upstream can still be reached, because each intercept server can still receive and transmit all the requests due to the bypass functionality provided for in switching device 210.

In a supplemental embodiment, the intercept servers can also share content. For example, if intercept server 130a' does not include a particular content object, then it can request upstream intercept servers 130a" or 130d if they can service that particular request. In one aspect, the overlay network 125 of intercept servers can share content like a content delivery network (CDN), and/or can access content on the upstream "intercepted" servers.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission mediums 110 and/or 115, which can include any form or medium of digital or analog data communication (e.g., a communication network). The transmission mediums 110 and/or 115 can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over the transmission mediums 110 and/or 115 can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

The computing system can include clients and servers. A client and a server are generally remote from each other and typically interact through a communication network. The relationship of client and server arises by virtue of computer programs running on the respective computers and having a client-server relationship to each other.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for network virtualization, the computerized method comprising:

receiving, via a first physical port of an intercept device coupled to a first communications network, a DNS response message from a DNS server on the first communications network, the DNS response including a domain name, a network address associated with the domain name, and a destination address of a first network device on a second communications network;

determining whether the domain name satisfies a DNS intercept criterion;

if the domain name satisfies the DNS intercept criterion, then updating a request intercept criterion to include the network address associated with the domain name;

transmitting, via a second physical port of the intercept device that is coupled to the second communications network, the DNS response message to the first network device;

determining whether the intercept device is in a bypass mode;

if the intercept device is in a bypass mode, then allowing one or more requests for service from the first network device that is addressed to a second network device on a third communications network to pass through to the second network device via a third physical port coupled to the third communications network;

if the intercept device is not in a bypass mode, then:

receiving, via the second physical port, a request for service from the first network device that is addressed to a second network device on a third communications network;

determining whether the request for service satisfies the request intercept criterion;

if the request for service satisfies the request intercept criterion, then:

(1) generating a response to the request for service, the generated response including data indicating that the generated response originated from the second network device; and (2) transmitting the generated response to the first network device; and if the request for service does not satisfy the request intercept criterion, then transmitting the request for service to the second network device via a third physical port coupled to the third communications network.

2. The computerized method of claim 1 wherein the domain name satisfies the DNS intercept criterion if the domain name is included in an intercept table of one or more domain names, the intercept table stored on a machine-readable storage medium of the intercept device.

3. The computerized method of claim 1 wherein the request intercept criterion is based on an intercept list of Internet Protocol (IP) addresses stored on a machine-readable storage medium of the intercept device.

4. The computerized method of claim 3 wherein updating the request intercept criterion to include the network address associated with the domain name comprises adding the network address to the intercept list of IP addresses.

5. The computerized method of claim 3 wherein updating the request intercept criterion to include the network address associated with the domain name comprises adding the network address to the intercept list of IP addresses.

6. The computerized method of claim 3 wherein the request for service satisfies the request intercept criterion if the destination address associated with the request for service is included in the intercept list of IP addresses.

7. The computerized method of claim 1 wherein the request for service comprises a request to retrieve content.

8. The computerized method of claim 7 wherein the content comprises graphical content, video content, audio content, or any combination thereof.

9. The computerized method of claim 7 wherein the request to retrieve content comprises an HTTP GET request.

10. The computerized method of claim 7 wherein the generated response comprises the content.

11. The computerized method of claim 7 further comprising retrieving the content from a machine-readable content database locally connected to the intercept device.

12. The computerized method of claim 1 wherein the request for service comprises a request to setup a TCP connection between the first network device and the second network device.

13. The computerized method of claim 12 wherein the generated response comprises a TCP handshake message.

14. The computerized method of claim 1 wherein the generated response comprises two or more response messages including the requested service.

15. The computerized method of claim 1 wherein one or more intermediate communications networks separate the first communications network from the first physical port, the second communications network from the second physical port, or the third communications network from the third physical port.

16. The computerized method of claim 1 wherein the first and third communications networks are the same.

17. The computerized method of claim 16 wherein the first and third physical ports are the same.

18. The computerized method of claim 1 wherein the second communications network comprises an access network for one or more user devices and the third communications network comprises a core network.

19. A system for virtualizing a network, the system comprising:
a first physical port coupled to a first communications network;
a second physical port coupled to a second communications network;
a third physical port coupled to a third communications network;
a control processor having:
a computing means for receiving, via the first physical port, a DNS response message from a DNS server on the first communications network, the DNS response including a domain name, a network address associated with the domain name, and a destination address of a first network device on a second communications network;
a computing means for determining whether the domain name satisfies a DNS intercept criterion;
a computing means for updating a request intercept criterion to include the network address associated with the domain name, if the domain name satisfies the DNS intercept criterion;
a computing means for transmitting, via the second physical port, the DNS response message to the first network device;
a computing means for determining whether the intercept device is in a bypass mode;
if the intercept device is in a bypass mode, then a computing means for allowing one or more requests for service from the first network device that is addressed to a second network device on a third communications network to pass through to the second network device via a third physical port coupled to the third communications network;
if the intercept device is not in a bypass mode, then:
a computing means for receiving, via the second physical port, a request for service from the first network device that is addressed to a second network device on a third communications network;
a computing means for determining whether the request for service satisfies the request intercept criterion;
a computing means for, if the request for service satisfies the request intercept criterion:
(1) generating a response to the request for service, the generated response including data indicating that the generated response originated from the second network device; and
(2) transmitting the generated response to the first network device; and
a computing means for transmitting, via the third physical port, the request for service to the second network device, if the request for service does not satisfy the request intercept criterion.

20. A computer program product, tangibly embodied in a machine-readable storage device, the computer program product including instructions being operable to cause a data processing apparatus to:
receive, via a first physical port of an intercept device coupled to a first communications network, a DNS response message from a DNS server on the first communications network, the DNS response including a domain name, a network address associated with the domain name, and a destination address of a first network device on a second communications network;
determine whether the domain name satisfies a DNS intercept criterion;
if the domain name satisfies the DNS intercept criterion, then update a request intercept criterion to include the network address associated with the domain name;
transmit, via a second physical port of the intercept device that is coupled to the second communications network, the DNS response message to the first network device;
determine whether the intercept device is in a bypass mode;

if the intercept device is in a bypass mode, then allow one or more requests for service from the first network device that is addressed to a second network device on a third communications network to pass through to the second network device via a third physical port coupled to the third communications network;

if the intercept device is not in a bypass mode, then:

receive, via the second physical port, a request for service from the first network device that is addressed to a second network device on a third communications network;

determine whether the request for service satisfies the request intercept criterion;

if the request for service satisfies the request intercept criterion, then:

(1) generate a response to the request for service, the generated response including data indicating that the generated response originated from the second network device; and (2) transmit the generated response to the first network device; and if the request for service does not satisfy the request intercept criterion, then transmit the request for service to the second network device via a third physical port coupled to the third communications network.

21. The computerized method of claim 1 wherein one or more intermediate communications networks separate the first communications network from the first physical port, the second communications network from the second physical port, and the third communications network from the third physical port.

* * * * *